(12) United States Patent
Corley et al.

(10) Patent No.: US 8,458,337 B2
(45) Date of Patent: Jun. 4, 2013

(54) METHODS AND APPARATUS FOR SCOPED ROLE-BASED ACCESS CONTROL

(75) Inventors: Carole Rhoads Corley, Cedar Park, TX (US); Jorge Lobo, New York, NY (US); Lorraine Phyllis Vassberg, Austin, TX (US); Xiping Wang, Putnam Vally, NY (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 12/135,535

(22) Filed: Jun. 9, 2008

(65) Prior Publication Data
US 2008/0243856 A1 Oct. 2, 2008

Related U.S. Application Data

(63) Continuation of application No. 11/479,356, filed on Jun. 30, 2006, now abandoned.

(51) Int. Cl.
*G06F 15/16* (2006.01)
*G06F 15/173* (2006.01)
*G06F 17/30* (2006.01)

(52) U.S. Cl.
USPC .............. 709/227; 709/225; 709/229; 726/27

(58) Field of Classification Search
USPC .................................. 709/229; 707/781–788
See application file for complete search history.

(56) References Cited

U.S. PATENT DOCUMENTS

| | | | |
|---|---|---|---|
| 5,220,604 A * | 6/1993 | Gasser et al. | 1/1 |
| 5,265,221 A * | 11/1993 | Miller | 711/163 |
| 5,881,225 A * | 3/1999 | Worth | 726/17 |
| 5,911,143 A * | 6/1999 | Deinhart et al. | 1/1 |
| 6,014,666 A * | 1/2000 | Helland et al. | 1/1 |
| 6,044,466 A * | 3/2000 | Anand et al. | 726/1 |
| 6,088,679 A * | 7/2000 | Barkley | 705/7.26 |
| 6,202,066 B1 * | 3/2001 | Barkley et al. | 707/785 |
| 6,233,576 B1 * | 5/2001 | Lewis | 1/1 |
| 6,460,141 B1 * | 10/2002 | Olden | 726/4 |
| 6,772,167 B1 * | 8/2004 | Snavely et al. | 1/1 |
| 6,947,989 B2 | 9/2005 | Gullotta et al. | |
| 6,965,994 B1 | 11/2005 | Brownell et al. | |

(Continued)

OTHER PUBLICATIONS

Georgiadis et al, Flexible Team-based Access Control Using Contexts, SACMAT 2001, ACM 2001.*

(Continued)

*Primary Examiner* — David Lazaro
*Assistant Examiner* — Robert Shaw
(74) *Attorney, Agent, or Firm* — Preston J. Young; Ryan, Mason & Lewis, LLP

(57) ABSTRACT

Methods and apparatus for providing role-based access control of a resource by a subject in an access control system are provided. The system comprises one or more roles capable of association with one or more subjects, and a plurality of permission sets. One or more of the plurality of permission sets are associated with each of the one or more roles. The system further comprises a plurality of resources. One or more of the plurality of resources are associated with each of the one or more permission sets, and each of the plurality of resources is associated with a set of one or more subjects. A given subject in a set of one or more subjects for a given resource and having a role-permission association with the given resource is provided access control of the given resource.

20 Claims, 2 Drawing Sheets

U.S. PATENT DOCUMENTS

| | | | | |
|---|---|---|---|---|
| 7,181,017 | B1* | 2/2007 | Nagel et al. | 380/282 |
| 7,308,702 | B1* | 12/2007 | Thomsen et al. | 726/1 |
| 7,404,203 | B2* | 7/2008 | Ng | 726/6 |
| 7,415,509 | B1* | 8/2008 | Kaltenmark et al. | 709/219 |
| 7,418,490 | B1* | 8/2008 | Zhang et al. | 709/223 |
| 7,523,506 | B1* | 4/2009 | Kumar et al. | 726/27 |
| 7,685,206 | B1* | 3/2010 | Mathew et al. | 707/785 |
| 2002/0026592 | A1* | 2/2002 | Gavrila et al. | 713/201 |
| 2002/0143735 | A1* | 10/2002 | Ayi et al. | 707/1 |
| 2002/0178119 | A1 | 11/2002 | Griffin et al. | |
| 2003/0078932 | A1* | 4/2003 | Kaiserwerth et al. | 707/100 |
| 2003/0105974 | A1* | 6/2003 | Griffin et al. | 713/200 |
| 2003/0107591 | A1* | 6/2003 | Jameson | 345/744 |
| 2003/0167269 | A1* | 9/2003 | Gupta | 707/9 |
| 2003/0229623 | A1* | 12/2003 | Chang et al. | 707/3 |
| 2004/0003112 | A1* | 1/2004 | Alles et al. | 709/237 |
| 2004/0044655 | A1* | 3/2004 | Cotner et al. | 707/3 |
| 2004/0083367 | A1 | 4/2004 | Garg et al. | |
| 2004/0268146 | A1* | 12/2004 | Oberst | 713/201 |
| 2005/0138419 | A1* | 6/2005 | Gupta et al. | 713/201 |
| 2005/0172151 | A1* | 8/2005 | Kodimer et al. | 713/201 |
| 2006/0047657 | A1* | 3/2006 | Frieder et al. | 707/9 |
| 2006/0089932 | A1* | 4/2006 | Buehler et al. | 707/9 |
| 2006/0136991 | A1* | 6/2006 | Kern | 726/2 |
| 2006/0161554 | A1* | 7/2006 | Lucovsky et al. | 707/10 |
| 2006/0218394 | A1* | 9/2006 | Yang | 713/167 |
| 2006/0259980 | A1* | 11/2006 | Field et al. | 726/27 |
| 2007/0089162 | A1* | 4/2007 | Park et al. | 726/1 |
| 2007/0283443 | A1* | 12/2007 | McPherson et al. | 726/26 |
| 2007/0294236 | A1* | 12/2007 | Vaughan et al. | 707/3 |

OTHER PUBLICATIONS

Kern and Walhorn, Rule Support for Role-Based Access Control, Proceedings of the 10$^{th}$ ACM Symp. on Access Control Models and Technologies (SACMAT'05), ACM (2005) pp. 130-138.*

Al-Kahtani and Sandhu. "Rule-Based RBAC with Negative Authorizations". In Proceedings of the 20$^{th}$ Annual Computer Security Applications Conference, Dec. 2004.*

Al-Kahtani and Sandhu "A Model for Attribute-Based User-Role Assignment", In Proceedings of the 18th Annual Computer Security Applications Conference, Dec. 2002 pp. 353-362.*

Sandhu et al, Role-Based Access Control Models, IEEE Computer, vol. 29, No. 2, Feb. 1996, pp. 38-47.*

Sandhu, Role-Based Access Control, Advances in Computers, vol. 46, Academic Press, 1998.*

Osborn et al, Configuring Role-Based Access Control to Enforce Mandatory and Discretionary Access Control Policies, ACM Transactions on Information and System Security, vol. 3, No. 2, May 2000, pp. 85-106.*

Giuri and Iglio. A formal model for role-based access control with constraints, Proceedings of the Ninth IEEE Computer Security Foundations Workshop, IEEE, 1996. pp. 136-145.*

Luigi Giuri. Role-based access control: a natural approach. In Proceedings of the First ACM Workshop on Role-Based Access Control (RBAC'95), pp. II-33-37,1995.*

Chen and Sandhu, Constraints for RBAC, ACM RBAC Workshop, 1996.*

N. Damianou, et al. Ponder—A Language for Specifying Security and Management Policies for Distributed Systems. The Language Specification, Version 1.11 Imperial College Research ReportDoC 2000/1, Jan. 18, 2000 http://www.doc.ic.ac.uk/research/technicalreports/2000/DTR00-1.pdf.*

Taylor & Murty, Implementing RBAC for Federated Information Systems on the Web, in: Australasian Information Security Workshop 2003 (AISW2003), Australian Computer Society, Inc., 2003.*

Kalish and Montague, Logic: Techniques of Formal Reasoning, Second Edition, Oxford Press, 1980.*

Ferraiolo et al, "Role-Based Access Control", Artech House, (2003).*

Ferraiolo, Barkley and Kuhn, A Role-Based Access Control Model and Reference Implementation Within a Corporate Intranet, ACM Transactions on Information and System Security, vol. 2, No. 1, Feb. 1999, pp. 34-64.*

Ferraiolo & Kuhn, "Role-Based Access Control," Proceedings of 15th National Computer Security Conference, (1992) pp. 554-563.*

Goodwin et al, "Instance-level access control for business-to-business electronic commerce" IBM Systems Journal, vol. 41, No. 2, 2002, pp. 303-317.*

Thomsen et al. Role Based Access Control Framework for Network Enterprises, Proceedings 14th Annual Computer Security Applications Conference, 1998 pp. 50-58.*

Zhang et al. A Role-Based Access Control Model and Implementation for Data-Centric Enterprise Applications: ICICS 2001, LNCS 2229, Springer-Verlag, 2001, pp. 316-327.*

Strembeck and Neumann, An Integrated Approach to Engineer and Enforce Context Constraints in RBAC Environments, ACM Transactions on Information and System Security, vol. 7, No. 3, Aug. 2004, pp. 392-427.*

Spengler, "Increasing Performance and Granularity in Role-Based Access Control Systems", 2005 http://www.grsecurity.net/researchpaper.pdf.*

Barkley et al, Role Based Access Control for the World Wide Web, 20th National Information System Security Conference NIST/NSA, 1997.*

Lampson, B. W., "Protection," in Proc. Fifth Princeton Symposium on Information Sciences and Systems, Princeton University, Mar. 1971, pp. 437-443, reprinted in Operating Systems Review, 8,1, ACM, Jan. 1974, pp. 18-24.*

A. Belokosztolszki, Role-based access control policy administration, University of Cambridge Tech Report No. 586 (Mar. 2004).*

Blobel et al. Modelling privilege management and access control, International Journal of Medical Informatics vol. 75 (2006) pp. 597-623.*

Giuri. Role-based access control: a natural approach. In Proceedings of the First ACM Workshop on Role-Based Access Control (RBAC'95), pp. II-33-37,1995.*

Giuri & Iglio. A formal model for role-based access control with constraints, Proceedings of the Ninth IEEE Computer Security Foundations Workshop, IEEE, 1996. pp. 136-145.*

D. Ferraiolo et al., entitled "Role-Based Access Control," Proceedings of 15th National Computer Security Conference, pp. 1-11, 1992.

* cited by examiner

METHODS AND APPARATUS FOR SCOPED ROLE-BASED ACCESS CONTROL

CROSS REFERENCE TO RELATED APPLICATIONS

This application is a continuation of pending U.S. application Ser. No. 11/479,356 filed on Jun. 20, 2006, the disclosure of which is incorporated herein by reference.

U.S. application Ser. No. 11/479,356 is related to: U.S. application Ser. No. 11/478,745 filed on Jun. 30, 2006;" U.S. application Ser. No. 11/478,747 filed on Jun. 30, 2006;" U.S. application Ser. No. 11/479,532 filed on Jun. 30, 2006;" and U.S. application Ser. No. 11/479,514 filed on Jun. 30, 2006, the disclosure of which is incorporated by reference herein.

FIELD OF THE INVENTION

The present invention relates to information technology (IT) systems and, more particularly, methods and apparatus for providing role-based access control of a system resource.

BACKGROUND OF THE INVENTION

In IT systems, a technical means for controlling access to computing or information resources must be provided for security purposes. A resource could represent data such as a file or database, network elements such as routers and switches, or computer systems. Access is the ability to manipulate, for example, view, add, modify, or delete, a resource. Access control is the means by which the ability to access is explicitly enabled or restricted in some way through system administration. Access controls can prescribe not only who or what process or entity may have access to a specific system resource, but also the type of access that is permitted.

The traditional Role-Based Access Control (RBAC) is a powerful technique developed for controlling access to resources in a complex system. With role-based access control access rights are grouped by role name, and the use of resources is restricted to users authorized to assume the associated role. For example, within an IT system the role of system administrator can include operations to perform resource viewing, addition, modification, deletion while the role of librarian can only include operations to view system resources. The advantage of having roles with associated groups of subjects is that by changing the permissions of a single role, the access rights of all the subjects in the group are changed.

However, there are drawbacks with the traditional RBAC system, especially in large distributed systems because subjects with the same role always have the same set of permissions against the same set of resources.

Subjects having the same role cannot be assigned access to different resources. Therefore, a subject belonging to a first organization having the same roles and permissions as a subject belonging to a second organization may have access to resources of the second organization. Additionally, there is no mechanism to distinguish a role across organizations in a large scale system where multiple organizations may be operating concurrently. To simplify the management of a large scale modern IT system, it is desirable to have a role that can have different meanings from organization to organization. For example, in a grid computing environment, the access rights of a role, such as librarian, may vary from organization to organization, and the role may have a different set of permissions in each organization, more specifically, organizations can independently assign permissions to roles according to local policies.

SUMMARY OF THE INVENTION

In accordance with the aforementioned and other objectives, the embodiments of the present invention are directed towards methods and apparatus for scoped role-based access control of a resource by a subject in an access control system.

For example, in one aspect of the present invention a method of providing role-based access control of a resource by a subject in an access control system is provided. It is determined if the resource is accessible by the subject. When the resource is accessible by the subject, it is determined if the resource is accessible by a role and an associated permission of the subject. When the resource is accessible by the role and the associated permission of the subject, access control of the resource by the subject is permitted. When the resource is not accessible by the subject or the role and the associated permission of the subject, access control of the resource by the subject is denied.

In additional embodiments of the present invention, it is determined if a table of one or more subjects that may access the resource comprises the subject. Further, it is determined if a table of one or more role-permission pairs that may access the resource comprise the role and the associated permission of the subject.

In another aspect of the invention, a role-based access control system is provided. The system comprises one or more roles capable of association with one or more subjects, and a plurality of permission sets. One or more of the plurality of permission sets are associated with each of the one or more roles. The system further comprises a plurality of resources. One or more of the plurality of resources are associated with each of the one or more permission sets, and each of the plurality of resources is associated with a set of one or more subjects. A given subject in a set of one or more subjects for a given resource and having a role-permission association with the given resource is provided access control of the given resource.

The embodiments of the present invention provide a scoped role-based access control system, in which a role is associated with multiple sets of permissions and multiple resources are bound to a permission set. A scope is created to associate subjects with resources and another scope is created to associate a set of resources with a role/permission set. This allows multiple subjects having the same role to have different set of permissions associated with their roles against separate sets of resources.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As will be illustrated in detail below, the embodiments of the present invention introduce techniques for providing scoped role-based access control of a resource by a subject in an access control system.

Figure 1:
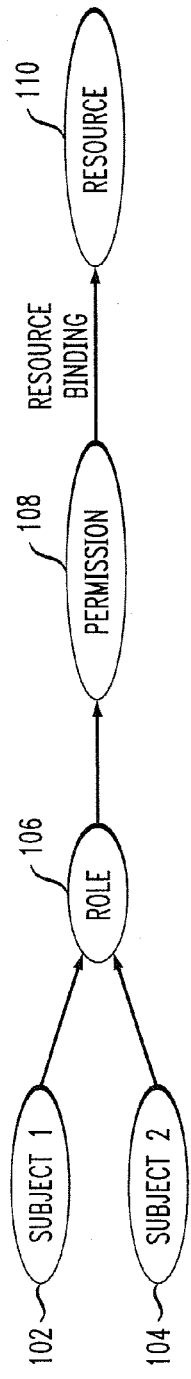
FIG. 1 is a diagram illustrating a conventional RBAC system.

Referring initially to FIG. 1 a diagram illustrates a conventional RBAC system. Subject-1 102 and Subject-2 104 are assigned a role 106 for access to specific resources. Role 106 is assigned to a specific set of permissions 108, and the specific resources 110 are bound to this set of permissions 108.

Figure 2:
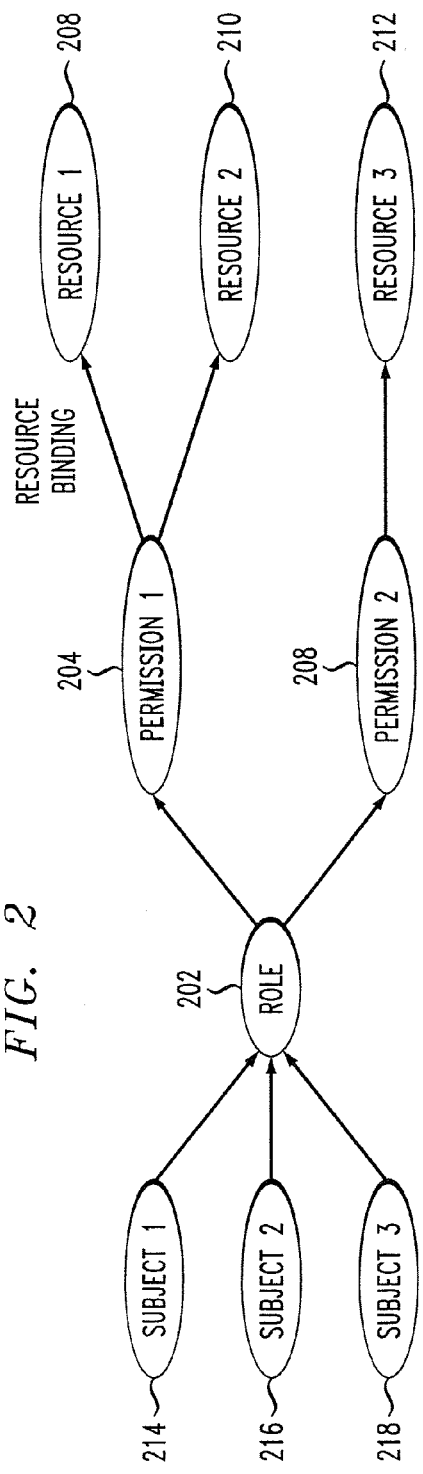
FIG. 2 is a diagram illustrating a scoped RBAC system, according to an embodiment of the present invention.

Referring now to FIG. 2, a diagram illustrates a scoped RBAC system, according to an embodiment of the present invention. A role 202 is associated with multiple permission sets 204, 206. Then a scope is created to associate a set of resources 208, 210 with permission set 204. In the embodiment of FIG. 2, two such scopes are shown, in that resource 212 is associated with permission set 206. This scope conveys the permission a subject has when accessing the resource under the role associated with the permission set. More specifically, this scope distinguishes a role across organizations in a large scale system where multiple organizations may be operating concurrently. The role may have different meanings from organization to organization.

Another scope is created to associate a set of subjects with a resource. For example subject-1 214 and subject-2 216 may be associated with resource-1 208, while subject-3 218 may not be associated with resource-1 208. In such an embodiment, only subject-1 214 and subject-2 216 may access resource-1 208. This scope conveys specific resource access rights to subjects that are granted that scope. Subjects having the same role can be assigned access to different resources. Therefore, even when roles and permission sets are the same in two separate organizations, the subjects from one organization may be prevented from accessing resources from another organization.

Thus, multiple subjects having the same role are given different permissions against separate resources across organizations in a complex modern computing environment. This extension does not affect the RBAC property that let the subject to role assignment be done independently from role to permission creation.

The embodiments of the present invention implement an access control operation that decides whether a subject in a particular role has the permission to perform an action in a given resource, more specifically, deny or allow access.

In accordance with a decentralized embodiment of the present invention, each resource maintains a table of subjects that are allowed to access the resource, similar to an access control list. This table maintains the subject-resource scope described above. In addition to this table, the resource maintains a second table that stores pairs of role-permission entries. This table maintains the role-permission scope for each resource. An entry in the table indicates that any subject with the role of the entry has the permission indicated in the entry. Multiple entries may exist per role and multiple entries may exist per permission.

Figure 3:
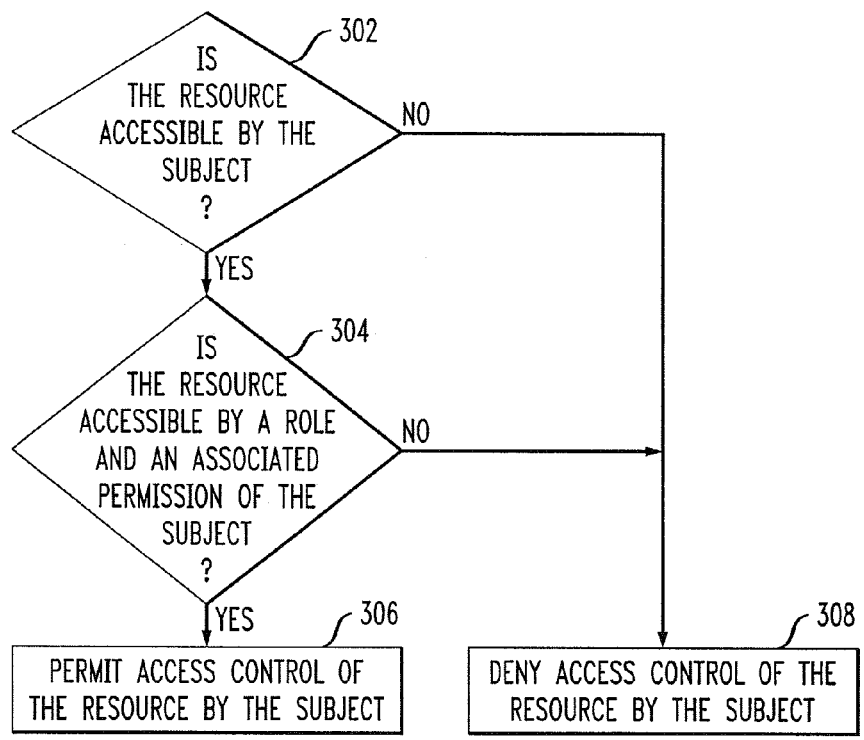
FIG. 3 is a flow diagram illustrating a scoped RBAC methodology, according to an embodiment of the present invention.

Referring now to FIG. 3, a flow diagram illustrates a scoped RBAC methodology, according to an embodiment of the present invention. The methodology begins in block 302, where it is determined if the resource is accessible by the subject. This may be accomplished by determining if the subject is in the access control table of the resource. If the resource is accessible by the subject, it is determined if the resource is accessible by a role and an associated permission of the subject in block 304. This may be accomplished by determining if the role and permission are in the second table of the resource as described above. If the resource is accessible by the role and the associated permission of the subject, access control of the resource is permitted by the subject in block 306, terminating the methodology. If the resource is not accessible by the subject or the role and the associated permission of the subject, access control of the resource is denied in block 308, terminating the methodology.

Tables may be implemented using distributed relational databases or distributed hashing tables. In this case a centralized system can implement the access control operation and the maintenance of the tables can be distributed to the resources. A fully centralized system can also be developed by keeping all the tables in a single database maintained by the access control system and not by the resources.

In accordance with the embodiments of the present invention multiple users in the same role may be allowed access to different resources, and a user in a role may have different permissions according to the resources he or she is trying to access.

If two users with access to the same resource under the same role will be allowed different permissions the two scope as described tables above may be combined in a single table. In this case, for each user, if a user can take a given role, there must be a subject-role-permission entry for each permission of the subject able to perform in that role.

Figure 4:
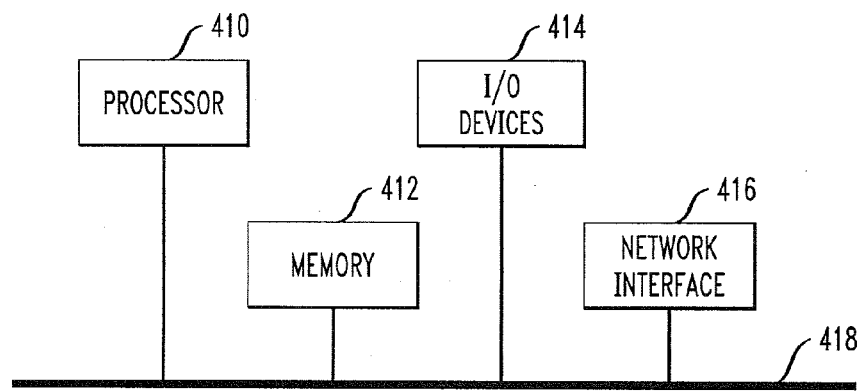
FIG. 4 is a diagram illustrating an illustrative hardware implementation of a computing system in accordance with which one or more components/methodologies of the present invention may be implemented, according to an embodiment of the present invention.

Referring now to FIG. 4, a block diagram illustrates an exemplary hardware implementation of a computing system in accordance with which one or more components/methodologies of the invention (e.g., components/methodologies described in the context of FIGS. 1-3) may be implemented, according to an embodiment of the present invention.

As shown, the computer system may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of providing role-based access control of a resource by a subject in an access control system comprising the steps of:

receiving a request to access a resource by a subject;

controlling access to the requested resource by a scoped role-based access control system, wherein the scoped role-based access control system defines a plurality of roles, wherein at least one role is associated with multiple permission sets wherein each permission set associated with a given role is bound to a set of different resources, and wherein a first scope is defined to directly associate a set of one or more subjects with a given resource, wherein multiple subjects having a same role can be assigned access to different resources associated with the same role based on different defined first scopes, and wherein a second scope is defined to associate a set of one or more resources with a given permission set associated with a given role, wherein the defined first and second scopes allow multiple subjects having a same role to have a different set of permissions associated with said same role against different sets of resources associated with the different sets of permissions of said same role, wherein controlling access to the requested resource comprises:

determining if the requested resource is accessible by the subject based on a defined first scope;

determining if the requested resource is accessible by a role and an associated permission set associated with the subject based on a defined second scope;

permitting access control of the requested resource by the subject when the requested resource is determined to be accessible by both the subject and the role and the associated permission set associated with the subject; and denying access control of the requested resource by the subject when the requested resource is determined to not be accessible by either the subject or the role and the associated permission set associated with the subject, wherein controlling access is implemented by a computer.

2. The method of claim 1, wherein the step of determining if the requested resource is accessible by the subject comprises the step of determining if the subject is included in a table of one or more subjects that may access the resource.

3. The method of claim 2, wherein the table of one or more subjects is implemented using at least one of a distributed relation database and a distributed hashing table.

4. The method of claim 2, wherein the table of one or more subjects is maintained by at least one of the access control system and the resource.

5. The method of claim 1, wherein the step of determining if the requested resource is accessible by a role and an associated permission set associated with the subject comprises the step of determining if the role and the associated permission set of the subject are included in a table of one or more role-permission pairs that may access the resource.

6. The method of claim 5, wherein each role-permission pair defines at least one action performable by an associated subject on the resource.

7. The method of claim 5, wherein the table of role-permission pairs is implemented using at least one of a distributed relation database and a distributed hashing table.

8. The method of claim 5, wherein the table of one or more role-permission pairs is maintained by at least one of the access control system and the resource.

9. The method of claim 1, wherein the step of determining if the requested resource is accessible by the subject comprises the step of determining if the subject is included in a table of subject-role-permission sets, and wherein the step of determining if the requested resource is accessible by a role and an associated permission set associated with the subject comprises the step of determining if the role and the associated permission set of the subject are included in a table of subject-role-permission sets.

10. Apparatus for providing role-based access control of a resource by a subject in an access control system, comprising:

a memory; and at least one processor coupled to the memory and operative to:

process of request to access a resource by a subject;

control access to the requested resource by a scoped role-based access control system, wherein the scoped role-based access control system defines a plurality of roles, wherein at least one role is associated with multiple permission sets wherein each permission set associated with a given role is bound to a set of different resources, and wherein a first scope is defined to directly associate a set of one or more subjects with a given resource, wherein multiple subjects having a same role can be assigned access to different resources associated with the same role based on different defined first scopes, and wherein a second scope is defined to associate a set of one or more resources with as given permission set associated with a given role, wherein the defined first and second scopes allow multiple subjects having a same role to have a different set of permissions associated with said same role against different sets of resources associated with the different sets of permissions of said same role, wherein the at least one processor is operative to control access to the requested resource by:

determining if the requested resource is accessible by the subject based on a defined first scope;

determining if the requested resource is accessible by as role and an associated permission set associated with the subject based on a defined second scope;

permitting access control of the requested resource by the subject when the requested resource is determined to be accessible by both the subject and the role and the associated permission set associated with the subject; and denying access control of the requested resource by the subject when the requested resource is determined to not be accessible by either the subject or the role and the associated permission set associated with the subject.

11. The apparatus of claim 10, wherein the operation of determining if the resource is accessible by the subject comprises the operation of determining if the subject is included in a table of one or more subjects that may access the resource.

12. The apparatus of claim 11, wherein the table of one or more subjects is implemented using at least one of a distributed relation database and a distributed hashing table.

13. The apparatus of claim 11, wherein the table of one or more subjects is maintained by at least one of the access control system and the resource.

14. The apparatus of claim 10, wherein the operation of determining if the requested resource is accessible by a role and an associated permission set associated with the subject comprises the operation of determining if the role and the associated permission set of the subject is included in a table of one or more role-permission pairs that may access the resource.

15. The apparatus of claim 14, wherein each role-permission pair defines at least one action performable by an associated subject on the resource.

16. The apparatus of claim 10, wherein the operation of determining if the requested resource is accessible by the subject comprises the operation of determining if the subject is included in a table of subject-role-permission sets and wherein the step of determining if the requested resource is accessible by a role and an associated permission set associated with the subject comprises the step of determining if the role and the associated permission set of the subject are included in a table of subject-role-permission sets.

17. An article of manufacture for providing role-based access control of a resource by a subject in an access control system, comprising a machine readable storage device containing one or more programs which when executed implement the steps of:

receiving a request to access as resource by a subject;

controlling access to the requested resource by a scoped role-based access control system, wherein the scoped role-based access control system defines a plurality of roles, wherein at least one role is associated with multiple permission sets wherein each permission set associated with a given role is bound to a set of different resources, and wherein a first scope is defined to directly associate a set of one or more subjects with as given resource, wherein multiple subjects having a same role can be assigned access to different resources associated with the same role based on different defined first scopes, and wherein a second scope is defined to associate a set of one or more resources with a given permission set associated with a given role, wherein the defined first and second scopes allow multiple subjects having a same role to have a different set of permissions associated with said same role against different sets of resources associated with the different sets of permissions of said same role, wherein controlling access to the requested resource comprises:

determining if the requested resource is accessible by the subject based on a defined first scope;

determining if the requested resource is accessible by a role and an associated permission set associated with the subject based on a defined second scope;

permitting access control of the requested resource by the subject when the requested resource is determined to be accessible by both the subject and the role and the associated permission set associated with the subject; and denying access control of the requested resource by the subject when the requested resource is determined to not be accessible by either the subject or the role and the associated permission set associated with the subject.

18. A role-based access control system for controlling access to a plurality of resources, comprising:

a memory; and at least one processor coupled to the memory and operative to:

define one or more roles capable of association with one or more subjects;

define a plurality of permission sets, wherein one or more of the plurality of permission sets are associated with each of the one or more roles, wherein at least one role is associated with multiple permission sets wherein each permission set is bound to a set of different resources of the plurality of resources, and define one or more scopes that directly associate each of the plurality of resources with a set of one or more subjects, wherein multiple subjects having a same role can be assigned access to different resources associated with the same role based on different defined scopes; and control access to the plurality of resources, wherein each of the plurality of resources are associated with set of one or more subjects wherein a given subject in a set of one or more subjects for a given resource and having a role-permission association with the given resource is provided access control of the given resource such that multiple subjects having a same role can have a different set of permissions associated with said same role against different sets of resources associated with the different sets of permissions of said same role.

19. The role-based access control system of claim 18, wherein each of the plurality of permission sets comprise one or more actions that may be performed on a resource.

20. The role-based access control system of claim 18, wherein a first subject of the one or more subjects and a second subject of the one or more subjects are both associated with a same role of the one or more roles but are associated with differing permission sets associated with the same role.

* * * * *